US008823630B2

(12) United States Patent
Roberts et al.

(10) Patent No.: US 8,823,630 B2
(45) Date of Patent: Sep. 2, 2014

(54) SYSTEMS AND METHODS FOR PROVIDING COLOR MANAGEMENT CONTROL IN A LIGHTING PANEL

(75) Inventors: John K. Roberts, Grand Rapids, MI (US); Keith J. Vadas, Lowell, MI (US)

(73) Assignee: Cree, Inc., Durham, NC (US)

( * ) Notice: Subject to any disclaimer, the term of this patent is extended or adjusted under 35 U.S.C. 154(b) by 765 days.

(21) Appl. No.: 11/958,721

(22) Filed: Dec. 18, 2007

(65) Prior Publication Data

US 2009/0153450 A1 Jun. 18, 2009

(51) Int. Cl.

| | |
|---|---|
| ***G09G 3/36*** | (2006.01) |
| ***G09G 5/10*** | (2006.01) |
| ***G09F 13/04*** | (2006.01) |
| ***G02F 1/1335*** | (2006.01) |

(52) U.S. Cl.

USPC ............. 345/102; 345/690; 362/97.3; 349/69

(58) Field of Classification Search

USPC ............. 345/76–77, 102, 204–207, 211–212, 345/690; 362/612, 97.1–97.4; 349/61, 349/68–70, 192

See application file for complete search history.

(56) References Cited

U.S. PATENT DOCUMENTS

| | | | | |
|---|---|---|---|---|
| 4,329,625 A | | 5/1982 | Nishizawa et al. | |
| 5,260,955 A | * | 11/1993 | Davis et al. | 372/31 |
| 5,493,183 A | * | 2/1996 | Kimball | 315/308 |
| 5,783,909 A | | 7/1998 | Hochstein | |
| 5,959,316 A | | 9/1999 | Lowery | |
| 6,078,148 A | | 6/2000 | Hochstein | |
| 6,127,784 A | | 10/2000 | Grossman et al. | |
| 6,153,985 A | | 11/2000 | Grossman | |
| 6,236,331 B1 | | 5/2001 | Dussureault | |
| 6,285,139 B1 | | 9/2001 | Ghanem | |
| 6,350,041 B1 | | 2/2002 | Tarsa et al. | |
| 6,362,578 B1 | | 3/2002 | Swanson et al. | |
| 6,411,046 B1 | | 6/2002 | Muthu | |
| 6,441,558 B1 | | 8/2002 | Muthu et al. | |
| 6,495,964 B1 | * | 12/2002 | Muthu et al. | 315/149 |
| 6,498,440 B2 | | 12/2002 | Stam et al. | |
| 6,510,995 B2 | | 1/2003 | Muthu et al. | |
| 6,576,881 B2 | | 6/2003 | Muthu et al. | |
| 6,576,930 B2 | | 6/2003 | Reeh et al. | |

(Continued)

FOREIGN PATENT DOCUMENTS

| | | |
|---|---|---|
| JP | 2004-517445 A | 6/2004 |
| JP | 2006-276725 A | 10/2006 |
| WO | WO 02/052902 A2 | 7/2002 |
| WO | WO 2007/061758 A1 | 5/2007 |

OTHER PUBLICATIONS

Perduijn et al, "Light Output Feedback Solution for RGB LED Backlight Applications", SID 2003 Digest 43.2/A.

(Continued)

*Primary Examiner* — Joe H Cheng
*Assistant Examiner* — Keith Crawley
(74) *Attorney, Agent, or Firm* — Myers Bigel Sibley & Sajovec, P.A.

(57) ABSTRACT

Provided are systems and methods for providing a stabilized color management system in a solid state lighting panel. Methods according to some embodiments include receiving, in the microcontroller, a color management reference value corresponding to a color characteristic of the solid state lighting panel and adjusting a control mode of the microcontroller responsive to the color management reference value.

21 Claims, 7 Drawing Sheets

(56) References Cited

U.S. PATENT DOCUMENTS

| | | | | |
|---|---|---|---|---|
| 6,630,801 | B2 | 10/2003 | Schuurmans | |
| 6,674,060 | B2 | 1/2004 | Antila | |
| 6,741,351 | B2 | 5/2004 | Marshall et al. | |
| 6,809,347 | B2 | 10/2004 | Tasch et al. | |
| 6,836,081 | B2 | 12/2004 | Swanson et al. | |
| 6,841,804 | B1 | 1/2005 | Chen et al. | |
| 6,841,947 | B2 | 1/2005 | Berg-johansen | |
| 6,936,857 | B2 | 8/2005 | Doxsee et al. | |
| 6,947,017 | B1 * | 9/2005 | Gettemy | 345/63 |
| 7,009,343 | B2 | 3/2006 | Lim et al. | |
| 7,023,543 | B2 | 4/2006 | Cunningham | |
| 7,135,664 | B2 | 11/2006 | Vornsand et al. | |
| 7,140,752 | B2 | 11/2006 | Ashdown | |
| 7,173,384 | B2 | 2/2007 | Plotz et al. | |
| 7,186,000 | B2 | 3/2007 | Lebens et al. | |
| 7,202,608 | B2 | 4/2007 | Robinson et al. | |
| 7,208,713 | B2 | 4/2007 | Ishiguchi | |
| 7,213,940 | B1 | 5/2007 | Van De Ven et al. | |
| 7,256,557 | B2 | 8/2007 | Lim et al. | |
| 8,358,263 | B2 * | 1/2013 | Ng et al. | 345/102 |
| 2002/0180721 | A1 * | 12/2002 | Kimura et al. | 345/211 |
| 2002/0190972 | A1 | 12/2002 | Ven de Van | |
| 2003/0058202 | A1 * | 3/2003 | Evanicky et al. | 345/82 |
| 2003/0089918 | A1 | 5/2003 | Hiller et al. | |
| 2006/0007248 | A1 * | 1/2006 | Reddy et al. | 345/690 |
| 2006/0097978 | A1 * | 5/2006 | Ng et al. | 345/102 |
| 2006/0105482 | A1 | 5/2006 | Alferink et al. | |
| 2006/0109389 | A1 * | 5/2006 | Ichikawa et al. | 349/1 |
| 2007/0247414 | A1 | 10/2007 | Roberts | |
| 2008/0165116 | A1 * | 7/2008 | Herz et al. | 345/102 |
| 2009/0109293 | A1 * | 4/2009 | Coley et al. | 348/181 |

OTHER PUBLICATIONS

International Search Report and Written Opinion (9 pages) corresponding to International Application No. PCT/US07/12707; Mailing Date: Aug. 21, 2008.

U.S. Appl. No. 11/755,149, filed May 30, 2007, Van De Ven.

U.S. Appl. No. 12/257,804, filed Oct. 24, 2008, Negley.

Japanese Office Action Corresponding to Japanese Patent Application No. 2008-322115; Mailing Date: Dec. 21, 2012; 3 Pages (Foreign Text Only).

* cited by examiner

SYSTEMS AND METHODS FOR PROVIDING COLOR MANAGEMENT CONTROL IN A LIGHTING PANEL

FIELD OF THE INVENTION

The present invention relates to lighting, and more particularly, to controlling a solid state lighting panel.

BACKGROUND

Solid state lighting arrays are used for a number of lighting applications. Solid state lighting panels including arrays of solid state lamps have been used as direct illumination sources, for example, in architectural and/or accent lighting. A solid state lamp may include, for example, a packaged light emitting device including one or more light emitting diodes (LEDs). Inorganic LEDs typically include semiconductor layers forming p-n junctions. Organic LEDs (OLEDs), which include organic light emission layers, represent another type of solid state light emitting device. Typically, a solid state light emitting device generates light through the recombination of electronic carriers, i.e. electrons and holes, in a light emitting layer or region.

Solid state lighting panels are commonly used as backlights for small LCD display screens, such as LCD display screens used in portable electronic devices. In addition, there has been increased interest in the use of solid state lighting arrays for backlights of larger displays, such as LCD television displays.

For smaller LCD screens, backlight assemblies may employ white LED lamps that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

The color rendering index of a light source is a qualitative measure of the ability of the light generated by the source to accurately illuminate a broad range of colors. The color rendering index ranges from essentially zero for monochromatic sources to nearly 100 for incandescent sources. Light generated from a solid state light source may have a relatively low color rendering index, but this can be increased through use of multiple emitters of various color and/or by use of phosphor to broaden the emitted spectrum.

For illumination applications, it is often desirable to provide a lighting source that generates a white light having a high color rendering index, so that objects illuminated by the lighting panel may appear more natural. Accordingly, such lighting sources may typically include an array of solid state lamps including red, green and blue light emitting devices. When red, green and blue light emitting devices are energized simultaneously, the resulting combined light may appear white, or nearly white, depending on the relative intensities of the red, green and blue sources. There are many different chromaticities of light that may be considered "white." For example, some "white" light, such as light generated by incandescent lamps, may appear more yellowish, while other "white" light, such as light generated by some fluorescent lamps, may appear more bluish in color.

Solid state lamps, such as LED's, are current-controlled devices in the sense that the intensity of the light emitted from an LED is related to the amount of current driven through the LED. One common method for controlling the current driven through the solid state lamps to achieve desired intensity and color mixing is a Pulse Width Modulation (PWM) scheme. Many PWM schemes may pulse the solid state lamps alternately to a full current "ON" state followed by a zero current "OFF" state.

Designing a management control system that provides accuracy, uniformity and/or responsiveness may be difficult using conventional control system methodologies. For example, while a color management control system may produce undesirable output oscillations corresponding to, for example, sensor output noise, placing a filter on a sensor output may reduce control system responsiveness and cause oscillations from filter phase lag.

SUMMARY

Some embodiments of the present invention may provide methods of controlling a solid state lighting panel utilizing a microcontroller. In some embodiments, the methods may include receiving, in the microcontroller, a color management reference value corresponding to a color characteristic of the solid state lighting panel and adjusting a control mode of the microcontroller responsive to the color management reference value.

In some embodiments, adjusting a control mode includes operating the microcontroller in a closed loop control mode responsive to receipt of the color management reference value until the solid state lighting panel reaches a color characteristic target value corresponding to the color management reference value and operating the microcontroller in an open loop control mode when the solid state lighting panel substantially reaches the color characteristic target value. In some embodiments, the color management reference value includes a user input value.

Some embodiments may include estimating a color management change value as a difference between the color management reference value and a current color management value corresponding to a current color characteristic of the lighting panel and generating, if the color management change value is greater than a threshold value, an incremental value between the color management reference value and the current color management value. In some embodiments, the color management reference value includes a value from a calibration system and/or supervisory controller.

Some embodiments may include periodically operating the microcontroller in a closed loop control mode to correct for color characteristic drift. In some embodiments, the color characteristic includes lighting panel luminance. In some embodiments, the color characteristic includes a lighting panel chromaticity value.

Some embodiments of the present invention may provide a lighting panel system. Embodiments of such a system may include a lighting panel including multiple solid state lighting devices configured to be driven by multiple current drivers and a multi-mode color management system that is configured to control the lighting panel via the current drivers. The multi-mode color management system may be further configured to selectively operate in a closed loop control mode responsive to a dynamic input signal value.

In some embodiments, the multi-mode color management system includes a color management unit that is configured to receive sensor input from multiple lighting panel sensors. The color management unit may be further configured to generate color management information to control light output of the multiple solid state lighting devices.

In some embodiments, the multi-mode color management system includes a microcontroller that is configured to receive color management information from a color management unit and the dynamic input signal value from a user input, wherein the dynamic input signal value corresponds to a color characteristic of the lighting panel.

In some embodiments, the color characteristic of the lighting panel includes a solid state lighting panel luminance output. In some embodiments, the color characteristic of the lighting panel includes a solid state lighting panel chromaticity output.

In some embodiments, the multi-mode color management system includes a mode selection module that is configured to estimate a color management change value, compare the color management change value to a threshold value, and set a microcontroller to a closed loop control mode if the color management change value is greater than the threshold value. In some embodiments, the mode selection module is further configured to set the microcontroller to an open loop control mode if the color management change value is less than the threshold value.

In some embodiments, the color management change value includes a difference between the dynamic input signal value and a current color management value.

Some embodiments include an increment module that is configured to estimate multiple increment values between the dynamic input signal value and a current color management value.

Some embodiments include a backlit display device configured to utilize the lighting panel systems described herein.

Some embodiments of the present invention include methods of providing a stabilized color management system in a solid state lighting panel. Some embodiments of such methods may include receiving, in a microcontroller, a color management signal corresponding to a color characteristic of the solid state lighting panel, analyzing the color management signal relative to a current color management value that corresponds to a current color characteristic, and setting a control system mode responsive to analyzing the color management signal.

In some embodiments, receiving the color management signal includes receiving a color management reference value corresponding to a color characteristic of the solid state lighting panel. In some embodiments, the color management reference signal includes a user input signal.

In some embodiments, analyzing the color management signal includes comparing a color management reference value to the current color management value to determine a color management change value and comparing the color management change value to a threshold value. In some embodiments, setting the control system mode includes setting the microcontroller to an open loop control system mode if the color management change value is less than the threshold value.

In some embodiments, if the color management change value is greater than the threshold value, setting the control system mode further includes setting the microcontroller to a closed loop control system mode and calculating a plurality of color management change increment values configured to incrementally adjust the color characteristic from the current color management color value to the color management reference value. Some embodiments may include receiving, if the microcontroller is in the closed loop control mode, a color management feedback value from a solid state lighting panel photo sensor.

Some embodiments may include dynamically adjusting the threshold value responsive to the current color management value, wherein if the current color management value is closer to a minimum color management value than it is to a maximum color management value then the threshold is set to a first threshold and wherein if the current color management value is closer to a maximum color management value than it is to a minimum color management value then the threshold is set to a second threshold that is higher than the first threshold.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Figure 1:
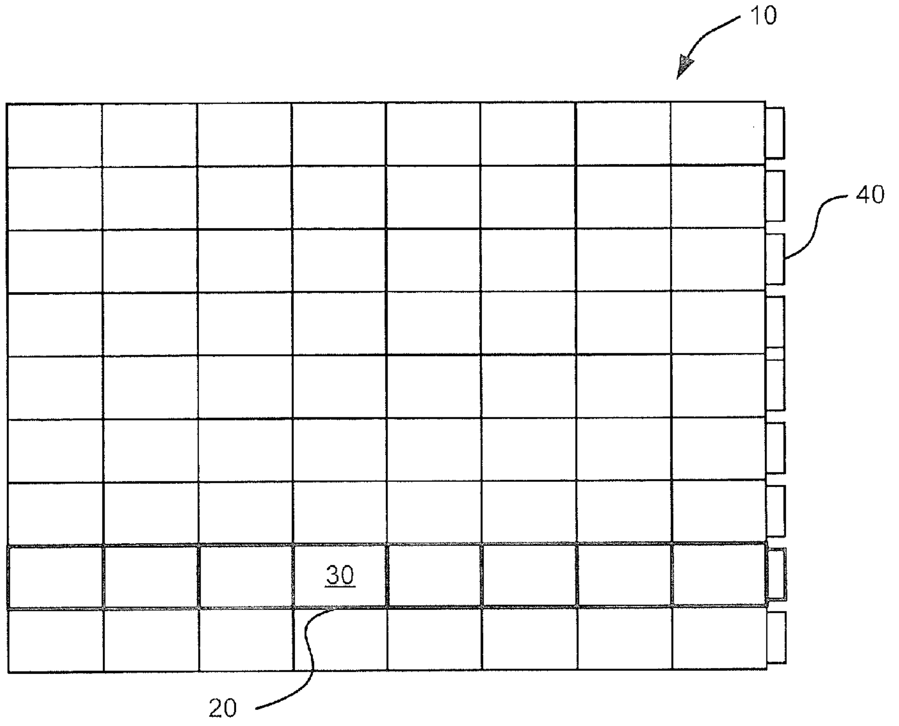
FIG. 1 is a block diagram illustrating a lighting panel according to some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will also be understood that when a first element, operation, signal, and/or value is referred to as "responsive to" another element, condition, signal and/or value, the first element, condition, signal, and/or value can exist and/or operate completely responsive to or partially responsive to the other element, condition, signal, and/or value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Some embodiments of the invention may arise from the recognition that a closed loop control system in a solid state backlight is complex based on the need for accuracy, uniformity, and/or responsiveness, that the effect of noise in a color characteristic sensor may produce unwanted fluctuations, and that filtering the sensor output may result in unwanted static oscillation around a color characteristic setpoint. Accordingly, some embodiments establish a light panel system that can set either an open loop control mode or a closed loop control mode responsive to control system demands. In this manner, unwanted control system oscillation may be reduced.

Some embodiments of the invention may be directed to flat-panel display applications. In flat-panel display applications, it may be desirable to achieve high color gamut with high efficiency. Increased gamut may allow the display to render a wider range of perceivable colors. In some embodiments, this may be achieved via multiple solid-state emitters or phosphors that may emit different dominant wavelengths such as, for example, red, green, blue, cyan and/or yellow, among others.

Reference is made to FIG. 1, which is a block diagram illustrating a lighting panel according to some embodiments of the invention. A lighting panel 10 may include multiple lighting panel bars 20 each having multiple tiles 30 that include solid state emitters. The solid state emitters may be serially arranged in, for example, strings. Each of the lighting panel bars 20 may include an interface 40 configured to provide electrical interconnection with a control system. Although presented in the context of a lighting panel 10 that includes multiple lighting panel bars 20, some embodiments of lighting panels 10 described herein be configured without multiple lighting panel bars 20 and/or multiple tiles 30. For example, in some embodiments, lighting panel may be configured to include a unitary structure that includes multiple solid state emitters.

Figure 2:
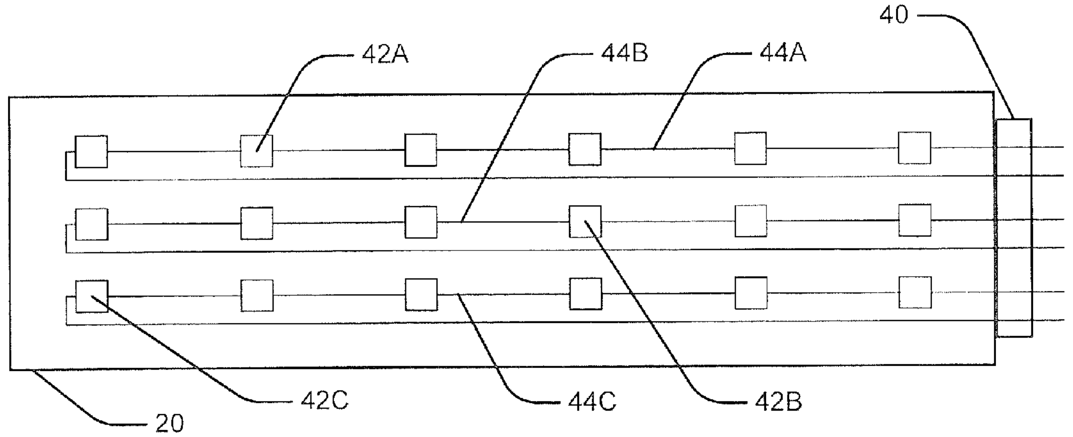
FIG. 2 is a schematic diagram illustrating a lighting panel bar according to some embodiments of the present invention.

Reference is now made to FIG. 2, which is a schematic diagram illustrating a lighting panel bar 20 according to some embodiments of the present invention. In some embodiments, a lighting panel bar 20 can include multiple strings 44A-C that can each include multiple solid state lighting devices 42A-C. Each string 44 may be configured to be substantially the same or each one can differ in one or more ways. In some embodiments, each string 44A-C includes solid state lighting devices 42A-C that emit light in a different dominant wavelength. For example, solid state lighting devices 42A can be configured to emit light having a dominant wavelength generally corresponding to the color red. Similarly, solid state lighting devices 42B and 42C can be configured to emit light having dominant wavelengths corresponding to the colors green and blue, respectively.

A lighting panel bar 20 of some embodiments may include one or more strings 44 having solid state lighting devices 42 of different colors. For example a lighting panel bar 20 can include a least one string 44 having red solid state lighting devices, a least one string 44 having green solid state lighting devices, and a least one string 44 having blue solid state lighting devices. In this manner, by selectively controlling the amount and/or duty cycle of current supplied to each string, the chromaticity and/or luminosity of the light emitted by the panel lighting bar 20 can be controlled. The strings 44A-C can be controlled independent of one another or as a group corresponding to the panel lighting bar 20. Although discussed with reference to solid state lighting devices configured to emit light having different dominant wavelengths, the systems and methods herein may also be utilized in systems using solid state lighting devices configured to emit light in a single dominant wavelength. Furthermore, systems, etc., may use solid state LED's including phosphors that, when energized, emit light having multiple wavelengths and/or that otherwise emit broad-spectrum light, such as, for example, a phosphor coated blue LED.

Figure 3:
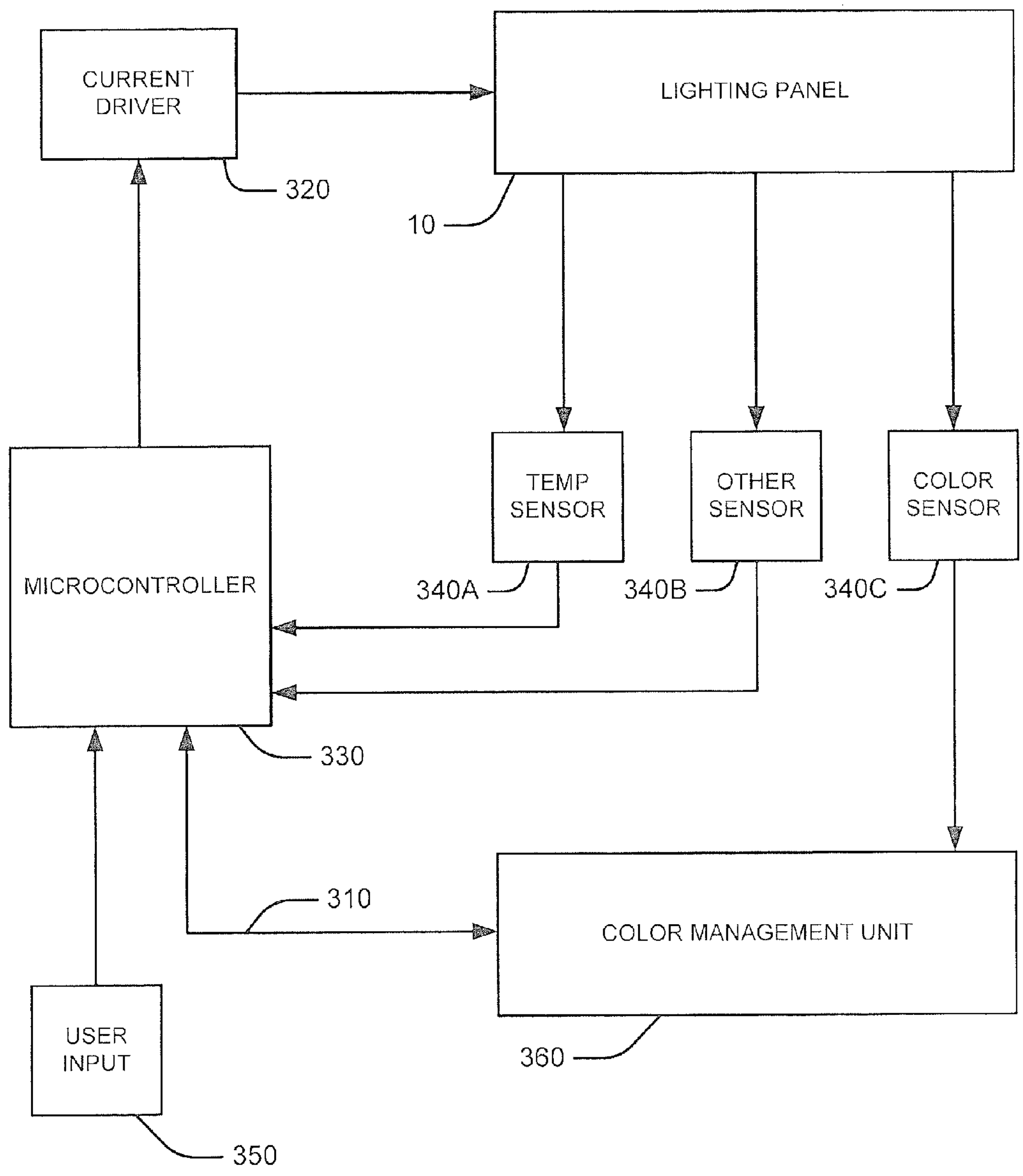
FIG. 3 is a block diagram illustrating a lighting panel system according to some embodiments of the present invention.

Reference is now made to FIG. 3, which is a block diagram illustrating a lighting panel system according to some embodiments of the present invention. A lighting panel 10 may be a solid state backlighting panel that may include multiple solid state emitters arranged in strings. In some embodiments, the lighting panel system includes a color management unit 360 configured to receive sensor input from color sensor 340C and generate color management information to control the light output of the strings.

One common method for controlling the current driven through the strings is a Pulse Width Modulation (PWM) scheme. Many PWM schemes may pulse the solid state lamps alternately to a full current "ON" state followed by a zero current "OFF" state. The output of the string may be controlled by varying the duty cycle, which is the percent of the cycle that the string is placed in an "ON" state. In some embodiments, if the pulse frequency is high enough, a change in duty cycle may vary the average current and the apparent luminosity of the string and/or emitter being pulsed in an approximately linear fashion. In some embodiments, the color management information is provided to a microcontroller 330 that uses the color management information and/or sensor inputs from temperature and other sensors 340A-B to adjust PWM duty cycles for the strings to cause the panel 10 to emit light having a desired chromaticity and/or luminance setting.

In some embodiments, the microcontroller 330 may be configured to accept user input 350, which may also be used to adjust the PWM duty cycles of the strings. The PWM duty cycle information may be used by the microcontroller 330 to switch on or off current drivers 320, which may drive strings and/or groups of solid state emitters in the lighting panel 10. In some embodiments, the microcontroller 330 may receive a user input 350 regarding a request for a change in a color characteristic of the lighting panel 10. The microcontroller 330 may generate PWM information responsive to the inputs received from user input 350, the color management unit 360, a temp sensor 340A and/or other sensors 340B, among others. A color characteristic may include, for example, a request for a change in luminance setting, which may be indicative of the total light emission of the lighting panel 10. In some embodiments, a color characteristic may include request for a change in the lighting panel chromaticity value and/or "white point". The chromaticity value may be controlled by varying the relative outputs of the different colored solid state emitters.

Figure 4:
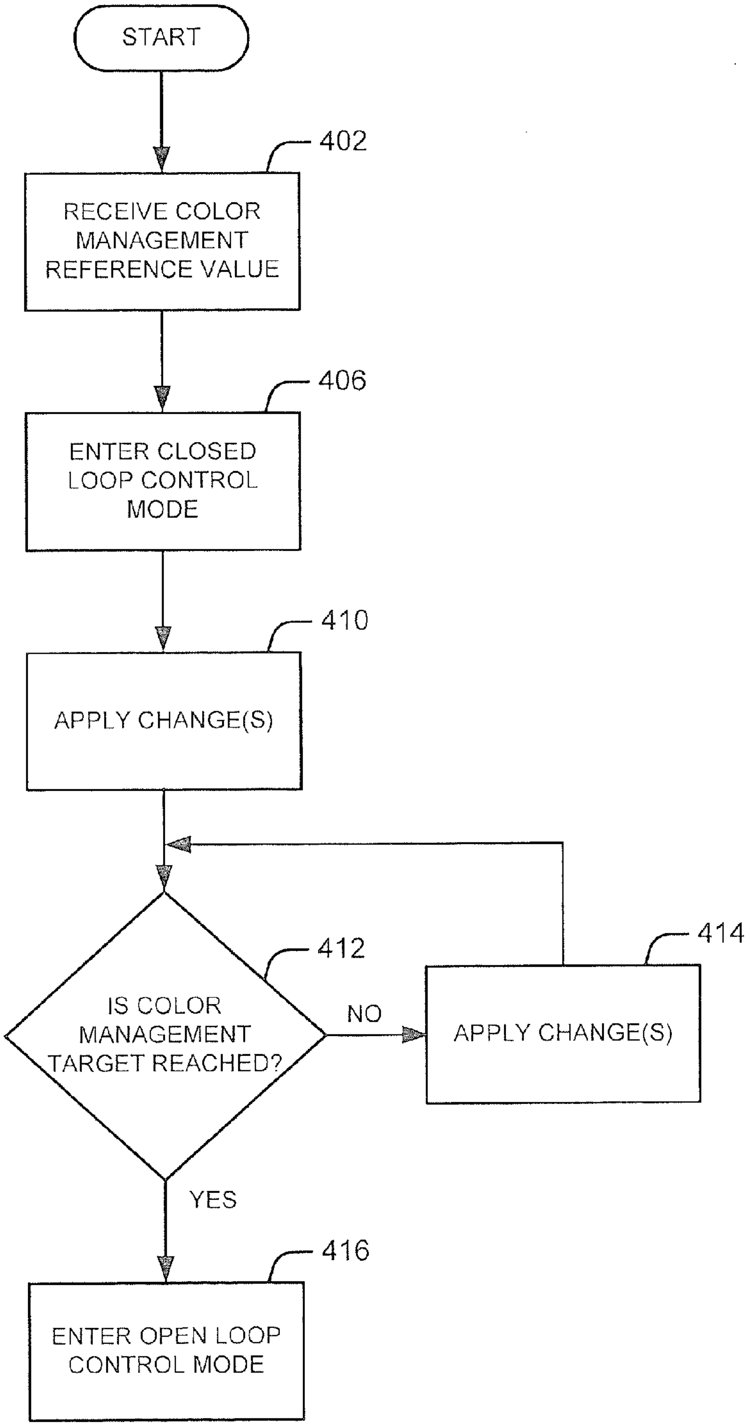
FIG. 4 is a flow diagram illustrating operations for protecting display components from adverse operating conditions according to some embodiments of the present invention.

Reference is now made to FIG. 4, which is a flow diagram illustrating operations for controlling a solid state lighting panel according to some embodiments of the present invention. Operations for controlling display components include receiving a color management reference value (block 402). In some embodiments, the color management reference value may be a user input signal that corresponds to a color characteristic of the solid state lighting panel. The user input signal may be received by a controller and/or color management unit configured to control the solid state lighting panel. In some embodiments, the controller may be, for example, a microcontroller. In some embodiments, the controller may be a functional and/or task specific processor such as, for example, an application specific integrated circuit (ASIC). Examples of color characteristics include, for example, luminosity and/or chromaticity, among others.

Responsive to receipt of the color management reference value, the controller may enter a closed loop control mode (block 406). The closed loop control mode provides for the use of feedback signals from, for example, sensors, to govern a change from a current color characteristic that corresponds to a current color management value to a color characteristic target that corresponds to the color management reference value. In this manner, a change in the color characteristic is applied via the controller (block 410).

Whether the color management target is reached is determined (block 412). If the color management target is not reached, then changes in the controller output are applied (block 414). If the color management target is reached, the controller may enter an open loop control node (block 416). The open mode control may not receive feedback signals from sensors. In this manner, unwanted oscillations in the output of the controller and thus the color characteristic due to sensor noise and/or other minor perturbances may be reduced. In some embodiments, the controller may periodically enter a closed loop control mode to correct for small and/or gradual deviations in color characteristics. For example, color and/or luminance drift may be corrected on a periodic basis, including, for example, a period of one or more seconds, minutes, hours and/or days, among others. In some embodiments, the periodic interval may be as long as years. In some embodiments, the interval may be determined by a trigger such as, for example, a user input signal, an external calibration system and/or a supervisory control system, among others.

Figure 5:
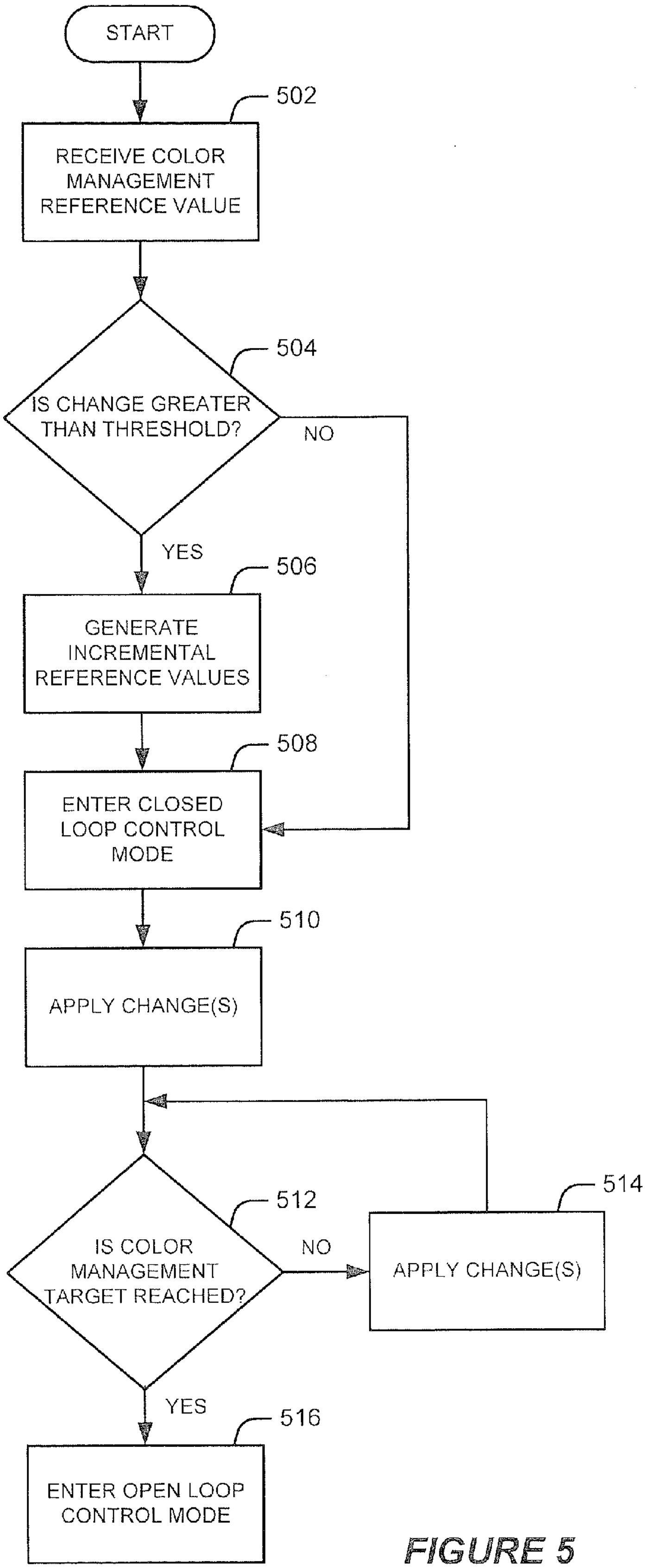
FIG. 5 is a flow diagram illustrating operations for controlling a solid state lighting panel according to some embodiments of the present invention.

Reference is now made to FIG. 5, which is a flow diagram illustrating operations for controlling a solid state lighting panel according to some embodiments of the present invention. Operations for controlling display components include receiving a color management reference value (block 502). In some embodiments, the color management reference value may be a user input signal that corresponds to a color characteristic of the solid state lighting panel. The user input signal may be received by a controller and/or color management unit configured to control the solid state lighting panel. In some embodiments, the controller may be a functional and/or task specific processor such as, for example, an application specific integrated circuit (ASIC). Examples of color characteristics include, for example, luminosity and/or chromaticity, among others.

Whether a color management change value is greater than a threshold value is determined (block 504). The color management change value may be determined by the difference, ratio and/or other relation between the received color management reference value and a current color management value that corresponds to a current color characteristic of the solid state lighting panel. In some embodiments, the threshold value may be predetermined as a fixed value. In some other embodiments, the threshold value may vary as a function of the current color management value relative to, for example, a color management value minimum, maximum and/or operating range. For example, if the current color management value is near a minimum and/or at the low end of the operating range, the threshold value may be lower than if the current color management value is near a maximum and/or at the high end of the operating range.

If the color management change value is greater than the threshold value then incremental color management reference values may be generated (block 506). In this manner, the requested change corresponding to the color management change value may be performed in smaller discrete increments and may include delays between each incremental change. By performing a large change in color management value incrementally, a closed loop control mode may slew more consistently and thus reduce overshoot and/or oscillation. For example, a user input may request a 30% change in luminance, which may be effected through three discrete 10% changes in luminance. After generating incremental color management reference values, the controller may enter a closed loop control mode to perform the requested change in color management value (block 508).

If the color management change value is not greater than the threshold value then incremental reference values may not be generated and the controller may enter a closed loop control mode to perform the requested change in color management value (block 508). This may generally be the case for less significant changes as reflected in a lower color management change value. The closed loop control mode provides for the use of feedback signals from, for example, sensors, to accomplish a change from a current color characteristic of the solid state lighting panel that corresponds to a current color management value to a color characteristic target that corresponds to the color management reference value. In this manner, a change in the color characteristic is applied via the controller (block 510).

A determination as to whether the color management target is reached may be made (block 512). If the color management target is not reached, then changes in the controller output are further applied (block 514). If the color management target is reached, the controller may enter an open loop control mode (block 516). The open loop control mode controller may not receive and/or utilize feedback signals from sensors. In this manner, unwanted oscillations in the output of the controller and thus the color characteristic due to sensor noise and/or other minor perturbances may be reduced. In some embodiments, the controller may periodically enter a closed loop control mode to correct for small and/or gradual deviations in color characteristics. For example, color and/or luminance drift may be corrected on a periodic basis, including, for example, one or more seconds, minutes, hours and/or days, among others. In some embodiments, the periodic interval may be as long as years. In some embodiments, the interval may be determined by a trigger such as, for example, a user input signal, an external calibration system and/or a supervisory control system, among others.

Figure 6:
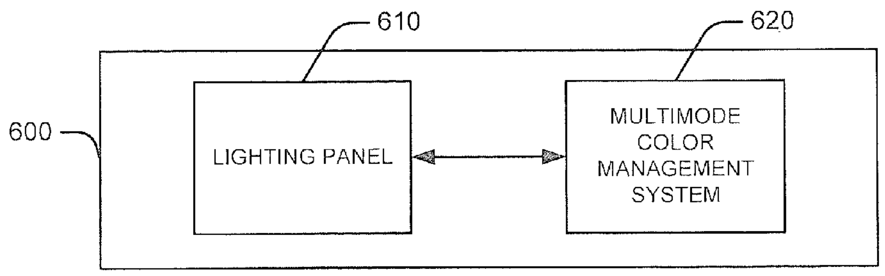
FIG. 6 is a block diagram illustrating a lighting panel system according to some embodiments of the present invention.

Reference is now made to FIG. 6, which is a block diagram illustrating a lighting panel system according to some embodiments of the present invention. The lighting panel system 600 may include a lighting panel 610 that includes multiple solid state lighting devices. In some embodiments, the solid state lighting devices may be configured in strings and/or clusters in a tile and/or bar arrangement. The lighting panel system 600 may include a multimode color management system 620 that is configured to selectively operate in a closed loop control mode responsive to a dynamic input signal value. In some embodiments, the multimode color management system includes a color management unit that is configured to receive sensor inputs from multiple lighting panel sensors. In some embodiments, the color management unit is configured to generate color management information for controlling the light output of the multiple solid state lighting devices.

In some embodiments, the multimode color management system 620 includes a color management controller that is configured to receive color management information from a color management unit. The multimode color management system may be further configured to receive the dynamic input signal value from user input. In some embodiments, the dynamic input signal value corresponds to a color characteristic of the lighting panel 610. A color characteristic of the lighting panel 610 may include, for example, white point, color temperature, luminosity and/or chromaticity, among others.

In some embodiments, the multimode color management system 620 includes a mode selection module that is configured estimate a color management change value and compare the color management change value to the threshold value. The color management change value may be estimated as a difference between the dynamic input signal value and a current color management value corresponding to the current color characteristic of the lighting panel 610. A mode selection module may be further configured to set a color management controller to a closed loop control mode if the color management change value is greater than the threshold value. In some embodiments, the mode selection module may be configured to set a color management controller to an open loop control mode if the color management change value is less than the threshold value.

Some embodiments may include an increment module that is configured to estimate multiple increment values between the dynamic input signal value and the current color management value. By estimating multiple increment values, a large change may be divided into smaller discrete changes, which may be more effectively accomplished in a closed loop control mode.

Figure 7:
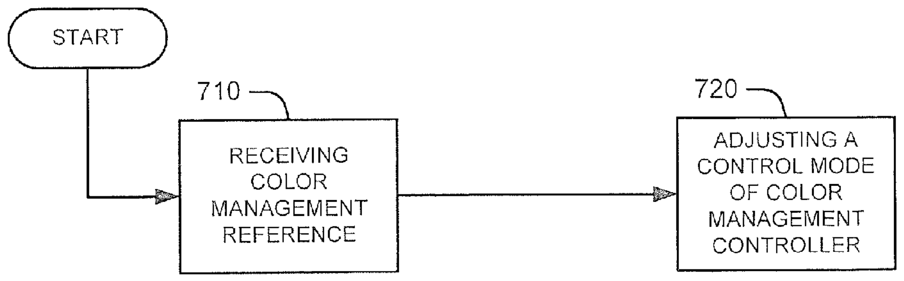
FIG. 7 is a flow diagram illustrating operations for controlling a solid state lighting panel according to some embodiments of the present invention.

Reference is now made to FIG. 7, which is a flow diagram illustrating operations for controlling a solid state lighting panel according to some embodiments of the present invention. In some embodiments, operations include receiving a color management reference value corresponding to a color characteristic of the solid state lighting panel into a color management controller (block 710). In some embodiments, the color management reference value may be received via a user input. For example, a user may adjust the color characteristic of the solid state lighting panel such as luminosity and/or chromaticity, among others. Operations may also include adjusting a control mode of the color management controller responsive to receipt of the color management reference value (block 720).

Figure 8:
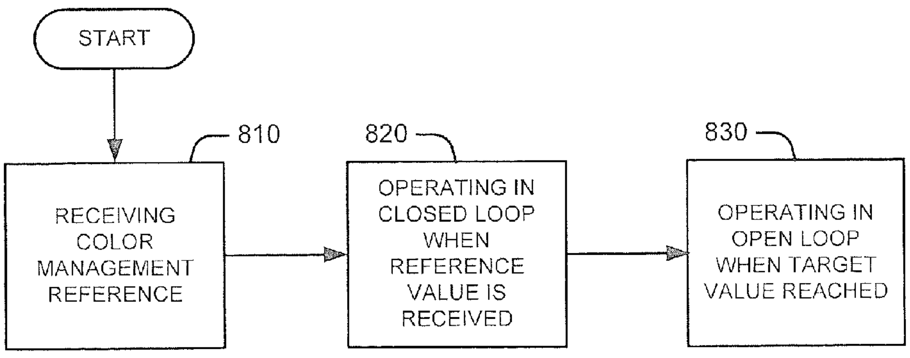
FIG. 8 is a flow diagram illustrating operations for controlling a solid state lighting panel according to further embodiments of the present invention.

Referring now to FIG. 8, which is a flow diagram illustrating operations for controlling a solid state lighting panel according to further embodiments of those illustrated in FIG. 7, adjusting the control mode may include operating a color management controller in a closed loop control mode responsive to receipt of the color management reference value (block 820). In some embodiments, the color management controller may be operated in the closed loop control mode until the solid state lighting panel reaches a color characteristic target value corresponding to the color management reference value. In some embodiments, adjusting the control mode may also include operating the color management controller in an open loop control mode when the solid state lighting panel reaches the color characteristic target value (block 830).

Figure 9:
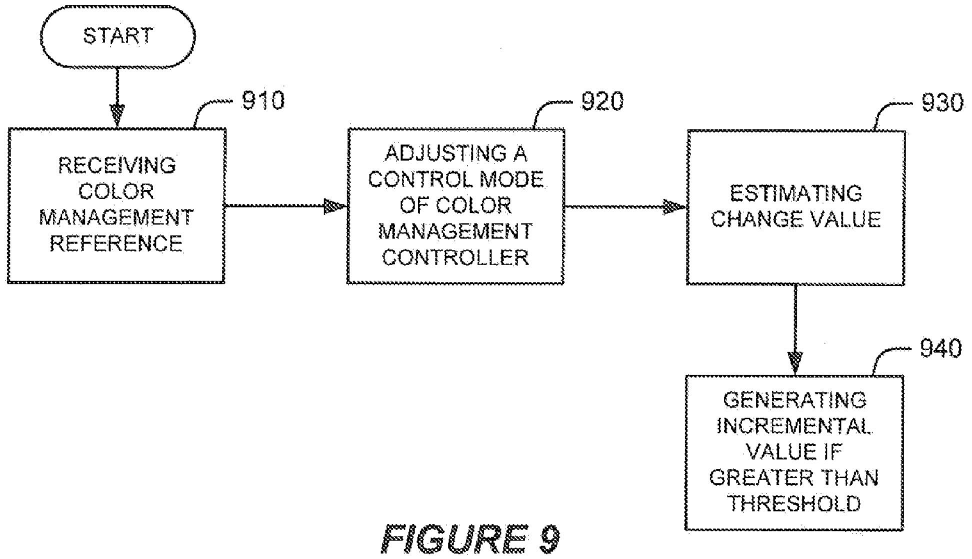
FIG. 9 is a flow diagram illustrating operations for controlling a solid state lighting panel according to yet further embodiments of the present invention.

Reference is now made to FIG. 9, which is a flow diagram illustrating operations for controlling a solid state lighting panel according to yet further embodiments of the present invention. In some embodiments, operations include receiving a color management reference value corresponding to a color characteristic of the solid state lighting panel into a color management controller (block 910). In some embodiments, the color management reference value may be received via a user input. For example, a user may adjust the color characteristic of the solid state lighting panel such as luminosity and/or chromaticity, among others. Operations may also include adjusting a control mode of the color management controller responsive to receipt of the color management reference value (block 920). For example, the color management controller may be set to a closed loop control mode upon receipt of a color management reference value.

Some embodiments include estimating a color management change value as a difference between the color management reference value and a current color management value that corresponds to a current color characteristic of lighting panel (block 930). In this manner, the amount of requested change in color characteristic may be determined. If the color management change value is greater than a threshold value, an incremental value between the color management reference value and the current color management value may be generated (block 940). By generating an incremental value, the control system may accommodate a large change in the luminance and/or color setpoint via multiple smaller discrete changes. Additionally, in some embodiments, the smaller discrete changes may include delays therebetween to further improve control system stability. In this manner the control system may slew more consistently, which may reduce overshoot and/or oscillations.

Figure 10:
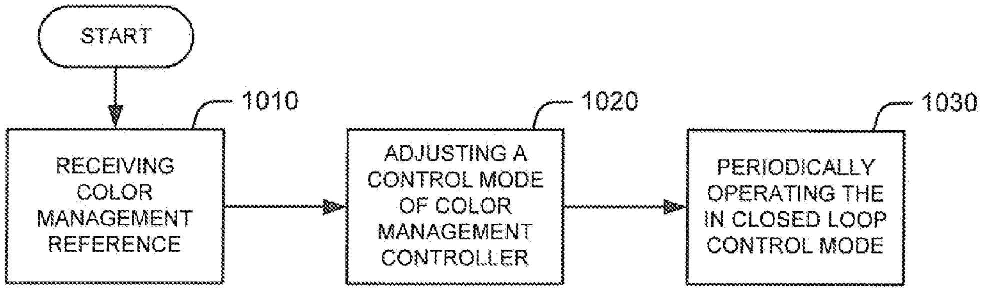
FIG. 10 is a flow diagram illustrating operations for controlling a solid state lighting panel according to some embodiments of the present invention.

Reference is now made to FIG. 10, which is a flow diagram illustrating operations for controlling a solid state lighting panel according to some embodiments of the present invention. In some embodiments, operations include receiving a color management reference value that corresponds to a color characteristic of the solid state lighting panel into a color management controller (block 1010). In some embodiments, the color management reference value may be received via a user input. For example, a user may adjust the color characteristic of the solid state lighting panel such as luminosity and/or chromaticity, among others. Operations may also include adjusting a control mode of the color management controller responsive to receipt of the color management reference value (block 1020). For example, the color management controller may be set to a closed loop control mode upon receipt of a color management reference value.

Some embodiments include periodically operating the color management controller in a closed loop control mode (block 1030). For example, in the absence of a received color management reference value, the color management controller may switch to a closed loop control mode to correct color and/or luminance drift. The period by which the color management controller may switch to a closed loop control mode may be defined in terms of seconds, minutes and/or hours or more. In some embodiments, the periodic interval may be as long as years. In some embodiments, the interval may be determined by a trigger such as, for example, a user input signal, an external calibration system and/or a supervisory control system, among others. In some embodiments, a supervisory control system may include a control system configured to control a facility, building, site, system and/or operation, among others.

Figure 11:
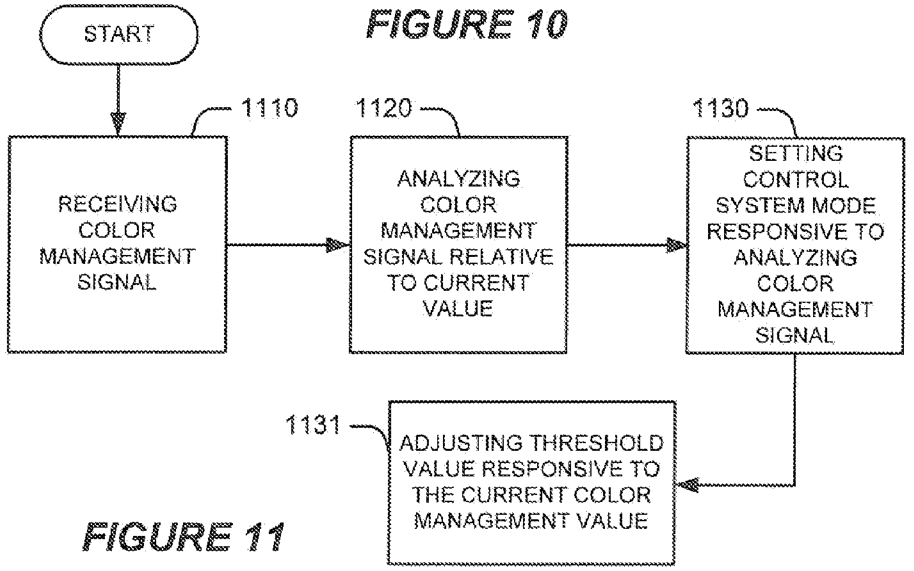
FIG. 11 is a flow diagram illustrating operations for providing a stabilized color management system in a solid state lighting panel according to some embodiments of the present invention.

Reference is now made to FIG. 11, which is a flow diagram illustrating operations for providing a stabilized color management system in a solid state lighting panel according to some embodiments of the present invention. In some embodiments, operations include receiving, into a color management controller, a color management signal corresponding to a color characteristic of the solid state lighting panel (block 1110). In some embodiments, receiving the color management signal may include receiving a color management reference value corresponding to a color management characteristic of the solid state lighting panel. Some embodiments provide that the color management reference signal is received via a user input.

Embodiments may also include analyzing the color management signal relative to a current color management value that corresponds to a current color characteristic of the solid state lighting panel (block 1120). Embodiments may also include setting a control system mode responsive to analyzing the color management signal (block 1130).

In some embodiments, analyzing the color management signal includes comparing a color management reference value to the current color management value to determine a color management change value. Analyzing the color management signal may also include comparing the color management change value to a threshold value. In some embodiments, setting a control system mode may include setting the color management controller to an open loop control system mode if the color management change value is less than a threshold value.

In some embodiments, it if the color management change value is greater than the threshold value, setting the control system mode may include setting the color management controller to a closed loop control system mode. In such embodiments, multiple color management change increment values may also be calculated. In some embodiments, if the color management controller is in the closed loop control mode, a color management feedback value from a solid state lighting panel photo sensor may be received. Color management change increment values may be utilized to incrementally adjust the color characteristic from the current color management color value to the color management reference value. In this manner, a color characteristic may be gradually adjusted with reduced undesirable control system effects such as overshoot and/or oscillation.

Some embodiments may further include dynamically adjusting the threshold value responsive to the current color management value (block 1131). For example, if the current color management value is closer to a minimum color management value than it is to a maximum color management value then the threshold may be set to a lower threshold value. In contrast, if the current color management value is closer to a maximum color management value than it is to a minimum color management value than the threshold may be set to a higher threshold value. By dynamically adjusting the threshold value, a control system may be more resistant to unwanted static oscillation which may tend to occur more often and/or be more noticeable at low luminance settings, for example.

Figure 12:
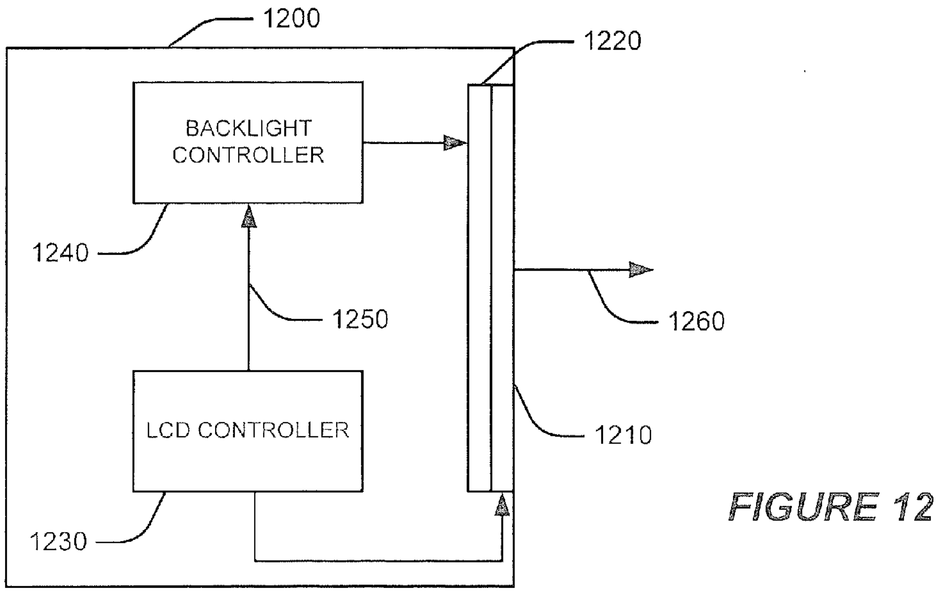
FIG. 12 is a block diagram illustrating backlit display device according to some embodiments of the present invention.

Reference is now made to FIG. 12, which is a block diagram illustrating backlit display device according to some embodiments of the present invention. A display device 1200 may include an LCD panel 1210, including a two-dimensional arrangement of liquid crystal shutters, that is controlled by an LCD controller 1230. The LCD controller 1230 may control the output image 1260 by varying states of the LCD shutters corresponding to different pixels.

The LCD panel 1210 relies on light transmission to control an output image 1260. In this manner, the display device 1200 may also include a lighting panel 1220 configured to provide light to be selectively transmitted through the shutters of the LCD panel 1210. A lighting panel 1220 may include multiple strings of solid state lighting emitters that can be controlled to achieve a desired chromaticity, saturation, and/or luminance. Varying the output of the string may be accomplished, for example, by turning the string on for a portion of a period, which may be controlled by a backlight controller 1240. In some embodiments, oscillations of one or more color characteristics the solid state backlight panel 1220 may be reduced by varying the control mode of the backlight controller between open loop and closed loop as a function of received color management value references signals. In this manner, display device 1200 may exhibit a desirable level of accuracy, uniformity, responsiveness with improved control system stability.

Figure 13:
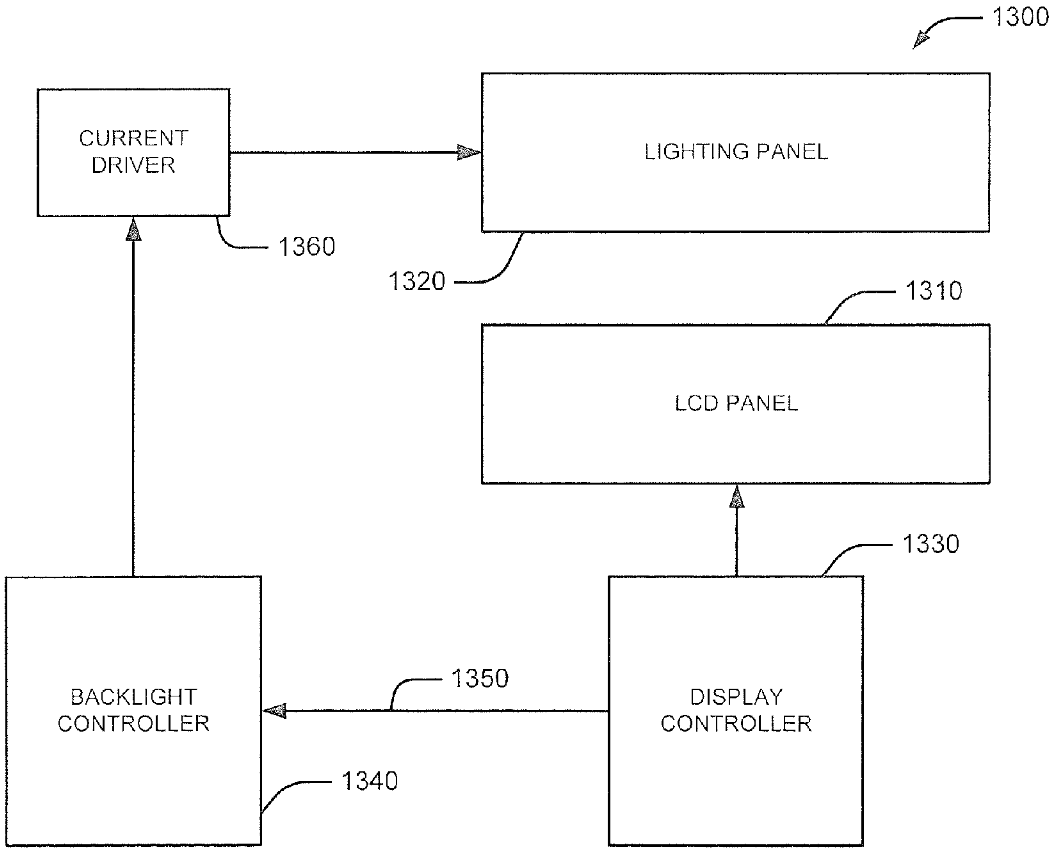
FIG. 13 is a block diagram illustrating systems/methods for controlling a solid state backlighting panel in backlit display device according to some embodiments of the present invention.

Reference is now made to FIG. 13, which is a block diagram illustrating systems/methods for controlling components in a backlit display device by controlling a lighting panel according to some embodiments of the present invention. An LCD panel 1310 is controlled by a display controller 1330, which refreshes the pixels and the LCD panel 1310 at a predetermined refresh rate. A lighting panel 1320 may also be included for providing luminance through the LCD panel 1310. The lighting panel 1320 may be controlled by a backlight controller 1340 that can drive multiple strings of solid state light emitters using a current driver 1360. The output of the lighting panel 1320 may be controlled by turning the emitters on for specific portions of a period. In some embodiments, oscillations of one or more color characteristics the lighting panel 1320 may be reduced by varying the control mode of the backlight controller between open loop and closed loop as a function of received color management value reference signals.

Although some embodiments are described in connection with LCD backlights, embodiments of the invention may be used for other purposes, such as, for example, general lighting. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of controlling a solid state lighting panel utilizing a microcontroller, the method comprising:

receiving, in the microcontroller, a color management reference value corresponding to a color characteristic of the solid state lighting panel;

estimating a color management change value using the color management reference value;

comparing the color management change value to a threshold value; and adjusting a control mode of the microcontroller responsive to the color management reference value, wherein the control mode includes a closed loop control mode that performs control operations based on a reference value and a feedback signal and an open loop control mode that adjusts the solid state lighting panel based on the reference value without the feedback signal, wherein adjusting the control mode comprises operating the microcontroller in the closed loop control mode responsive to the color management change value being greater than the threshold value, and wherein adjusting the control mode further comprises operating the microcontroller in the open loop control mode responsive to the color management change value being less than or equal to the threshold value.

2. The method of claim 1, wherein the color management reference value comprises a user input value.

3. The method of claim 1, wherein the color management reference value comprises a value from a calibration system and/or supervisory controller.

4. The method of claim 1, further comprising:

estimating a color management change value as a difference between the color management reference value and a current color management value corresponding to a current color characteristic of the lighting panel; and generating, if the color management change value is greater than a threshold value, an incremental value between the color management reference value and the current color management value.

5. The method of claim 1, further comprising, periodically operating the microcontroller in the closed loop control mode to correct for color characteristic drift.

6. The method of claim 1, wherein the color characteristic comprises lighting panel luminance.

7. The method of claim 1, wherein the color characteristic comprises a lighting panel chromaticity value.

8. A lighting panel system, comprising:

a lighting panel including a plurality of solid state lighting devices configured to be driven by a plurality of current drivers; and a multi-mode color management system that is configured to control the lighting panel via the plurality of current drivers and that is further configured to selectively operate in a closed loop control mode that performs control operations based on a feedback signal or an open loop control mode that adjusts the solid state lighting panel without the feedback signal, responsive to a dynamic input signal value, wherein the multi-mode color management system comprises a mode selection module that is configured to estimate a color management change value, compare the color management change value to a threshold value, set a microcontroller to the closed loop control mode if the color management change value is greater than the threshold value, and set the microcontroller to the open loop control mode if the color management value is less than or equal to the threshold value.

9. The system of claim 8, wherein the multi-mode color management system comprises a color management unit that is configured to receive sensor input from a plurality of lighting panel sensors, the color management unit configured to generate color management information to control light output of the plurality of solid state lighting devices.

10. The system of claim 8, wherein the multi-mode color management system comprises a microcontroller that is configured to receive color management information from a color management unit and the dynamic input signal value from a user input, wherein the dynamic input signal value corresponds to a color characteristic of the lighting panel.

11. The system of claim 10, wherein the color characteristic of the lighting panel comprises a solid state lighting panel luminance output.

12. The system of claim 10, wherein the color characteristic of the lighting panel comprises a solid state lighting panel chromaticity value.

13. The system of claim 8, wherein the color management change value comprises a difference between the dynamic input signal value and a current color management value.

14. The system of claim 8, further comprising an increment module that is configured to estimate a plurality of increment values between the dynamic input signal value and a current color management value.

15. A backlit display device configured to utilize the lighting panel system of claim 8.

16. A method of providing a stabilized color management system in a solid state lighting panel, the method comprising:

receiving, in a microcontroller, a color management signal corresponding to a color characteristic of the solid state lighting panel;

analyzing the color management signal relative to a current color management value that corresponds to a current color characteristic to determine a color management change value;

comparing the color management change value to a threshold value; and setting a control system mode responsive to analyzing the color management signal, wherein the control system mode is one of a closed loop control mode that performs control operations based on a reference value and a feedback signal and an open loop control mode that adjusts the solid state lighting panel based on the reference value without the feedback signal, wherein setting the control system mode comprises setting the microcontroller to the closed loop control system mode if the color management change value is greater than the threshold value and setting the microcontroller to the open loop control system mode if the color management change value is less than or equal to the threshold value, and wherein the reference value includes the color management signal.

17. The method of claim 16, wherein receiving the color management signal comprises receiving a color management reference value corresponding to a color characteristic of the solid state lighting panel.

18. The method of claim 17, wherein the color management reference signal comprises a user input signal.

19. The method of claim 16, wherein, if the color management change value is greater than the threshold value, setting the control system mode further comprises:

calculating a plurality of color management change increment values configured to incrementally adjust the color characteristic from the current color management color value to the color management reference value.

20. The method of claim 19, further comprising receiving, if the microcontroller is in the closed loop control mode, a color management feedback value from a solid state lighting panel photo sensor.

21. The method of claim 16, further comprising dynamically adjusting the threshold value responsive to the current color management value, wherein if the current color management value is closer to a minimum color management value than it is to a maximum color management value then the threshold is set to a first threshold and wherein if the current color management value is closer to a maximum color management value than it is to a minimum color management value then the threshold is set to a second threshold that is higher than the first threshold.

* * * * *